Nov. 7, 1950 W. G. BAUER 2,529,366
FLUIDIZING PROCESS AND MECHANISM
Filed March 2, 1945 4 Sheets-Sheet 1

INVENTOR:
WOLF G. BAUER,
BY Kingsland Rogers Ezell
ATTORNEYS.

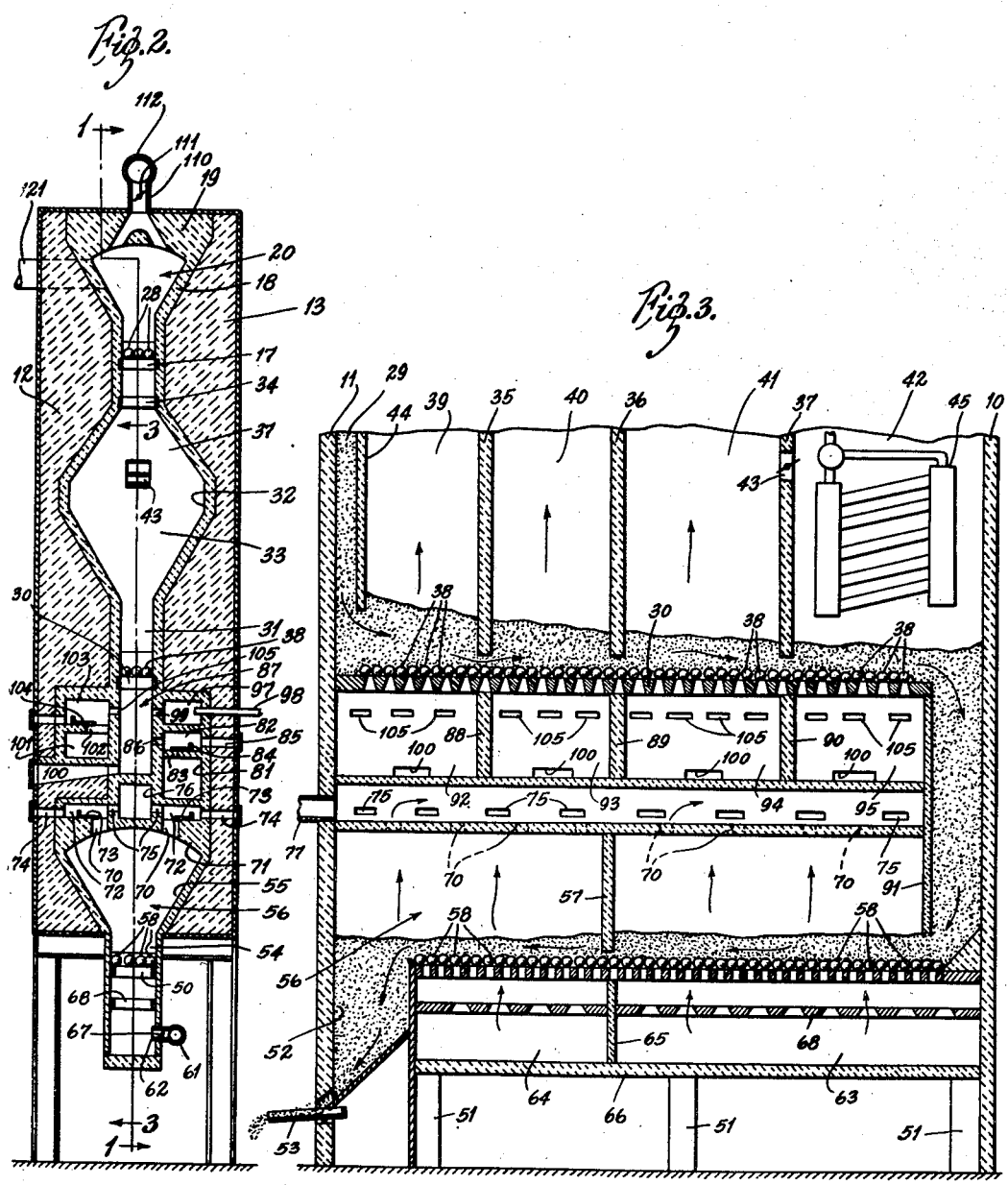

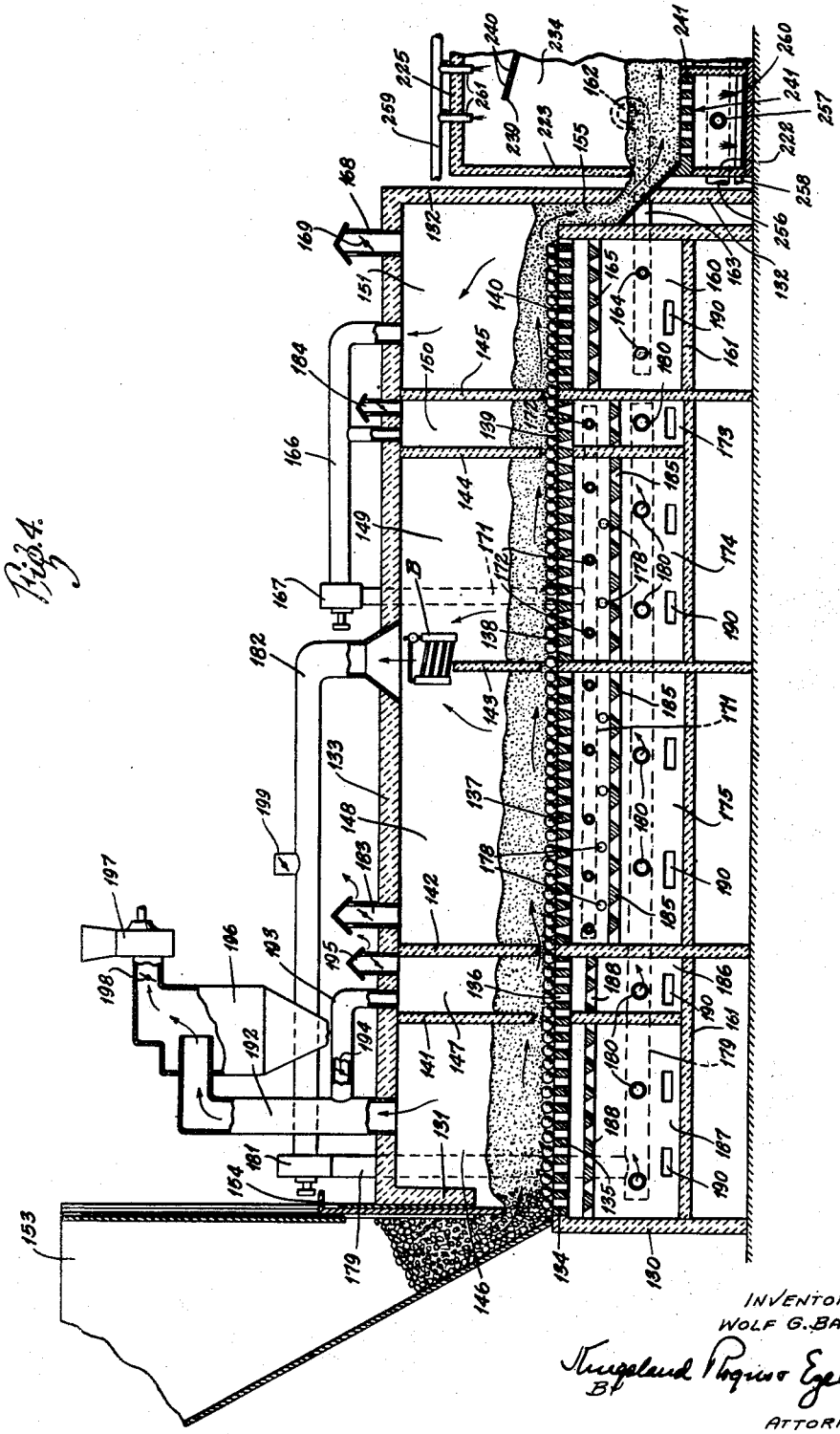

Nov. 7, 1950          W. G. BAUER          2,529,366
FLUIDIZING PROCESS AND MECHANISM
Filed March 2, 1945          4 Sheets—Sheet 4
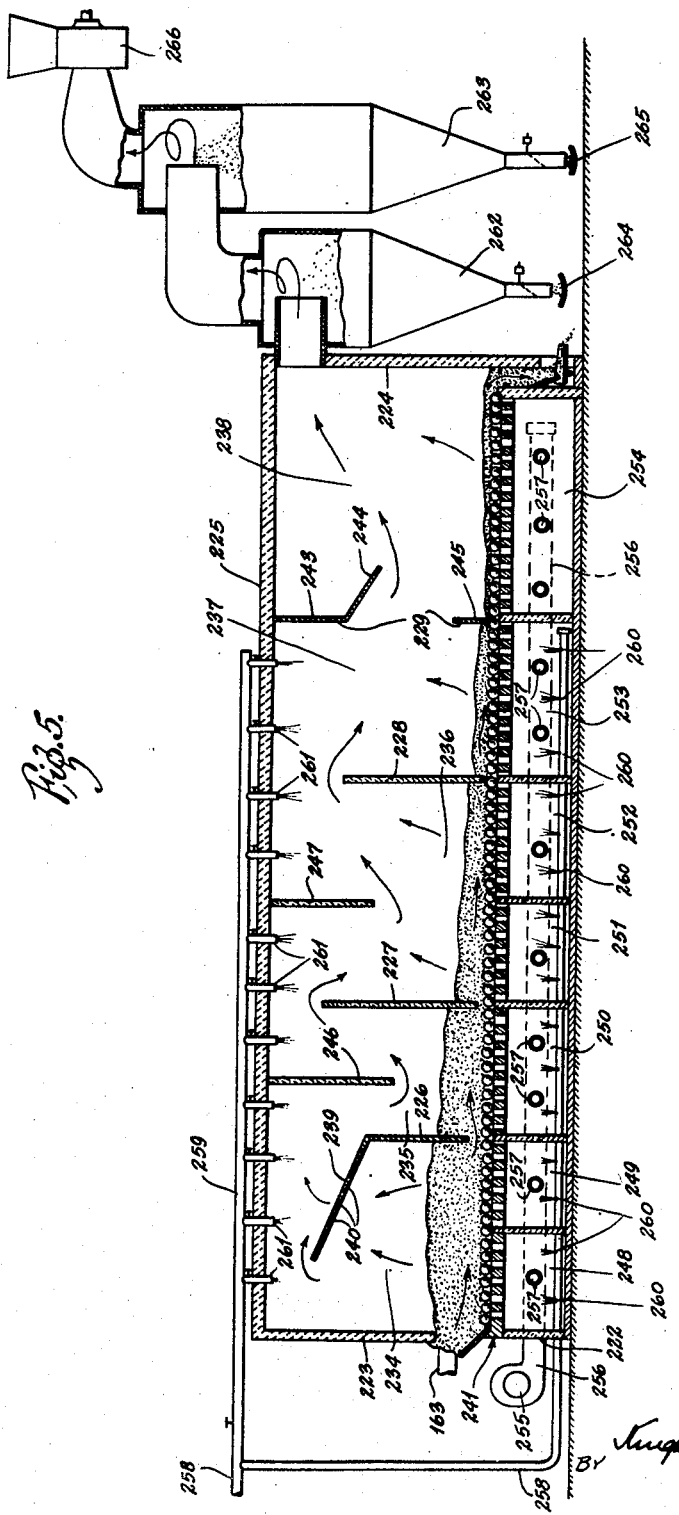
INVENTOR:
WOLF G. BAUER,
BY
ATTORNEYS.

Patented Nov. 7, 1950

2,529,366

UNITED STATES PATENT OFFICE 2,529,366

FLUIDIZING PROCESS AND MECHANISM

Wolf G. Bauer, St. Louis County, Mo.

Application March 2, 1945, Serial No. 580,692

31 Claims. (Cl. 263—53)

The present invention relates to a fluidizing process and mechanism. More particularly, it relates to a process and apparatus by which small solid particles may be reacted with gases, which gases are employed as the means to produce a mechanical suspension of the solid particles that have characteristics of a fluid.

It is an object to provide a fluidizing process and mechanism that will operate and produce its reactions in an open moving stream of small solid fluidized particles.

It is a particular object of the invention to fluidize an open stream of material so that the material itself flows laterally in the nature of a liquid in the fluidizing chamber. It is an especial object to attain the foregoing while reacting the material within the fluidizing chamber to alter it chemically. It is a further object to react the open stream chemically, by means of the fluidizing gases, preferably, so that the material changes its chemical structure, and, at the same time, to control the fluidizing process and mechanism to accommodate the differences in chemical and physical properties of the material as it is successively reacted.

It is a further object to provide a fluidizing process wherein a stream of material is subjected to a series of fluidizing operations in which a series of physical or chemical changes in the material is effected. An especial object is to provide a fluidizing operation wherein a material may be serially reacted chemically to produce one change, and, without breaking the stream, thereafter reacted to produce another chemical change.

A further object is to provide a series of fluidizing courses, gas-locked from each other, without breaking the over-all flow through all of them, and particularly to provide such series wherein gas from one source is passed through the solid material of another course.

As a particular application, and hence as a particular object, it is a purpose of the invention to provide a fluidizing process in which material is fluidized by combustion gases, partly or wholly externally supplied, and is reacted by the the same combustion gases. Particularly, it is a purpose to provide such a process and mechanism wherein the material in the stream is also fluidized by reacting gases which are applied both as fluidizing and entraining gases, to effect separation of materials in the flowing stream, and simultaneous reaction thereof.

A further object of the invention is to effect an open stream of fluidized solids, obtaining controlled flow in a given direction along a bed from one end to the other, and processing the material or the gas or both, during the stream flow. More particularly, it is an object to effect a stream flow of this kind in which the bed is divided into a plurality of zones in which individual fluidizing control, or reacting control, or both, are effected, to obtain individual control of temperature, bed level, agitation, and reacting gas quality.

A further specific object is to provide a fluidized stream flowing over a bed from one end to the other, with controlled level of surface between one end and the other, especially where said controlled level is attained by controlling the rate of ingress at one end of the bed and the rate of egress at the other.

A particular object is to provide a system of this kind wherein the rate of inflow of material to the fluidized bed is controllable by regulation of the discharge rate from the apparatus. It is an object to control depth of material in a fluidizing system by regulating the size of the inflow orifice for the solid material, and the fluidizing gas velocity.

Particularly, it is an object to attain the controlled bed of fluidized material in a sealed chamber with inlet and outlet gas-locked, and especially where the bed is divided from end to end into zones.

A further object is to attain, by a combination of fluidizing and entraining operating through a series of chambers separated by baffles, a separation of reactable and non-reactable materials, coupled with an entrainment of the reactable materials and further reaction thereof in the entrainment chambers, with zone control of temperature and reaction conditions.

It is a further object to provide a method and an apparatus peculiarly efficient in operations involving gas-solid reaction, such as activation of carbon, alumina, and the like, preparation or rejuvenation of filter absorption media, hydration and dehydration of lime and gypsum salts, chloridization of gold and silver ores, calcination of magnesite, dolomite, limestone and the like, roasting or reduction of ores and concentrates of copper, lead, zinc, aluminum, tin, cobalt, antimony, mercury, manganese, etc., and other operations such as catalytic reactions as used in the oil industry.

As a further particular application of the invention, and hence as an object thereof, it is a purpose to provide a process, attaining the foregoing objectives, which is employed for the calcination of limestone. In this connection, it is an object of the invention to provide a method and mechanism for reduction of ore material, and particularly limestone, that will reduce the time required for such reduction by a very large percentage, and particularly one that thereby will prevent fusion between the lime and its impurities. A further object is to provide a method and mechanism that will treat small limestone particles which have heretofore been virtually untreatable. A further object is to provide a method and mechanism adapted to the hydration of lime immediately following calcination and when lime is most reactive, and by a combination continuous process. Other objects will appear in the description to follow in which:

Fig. 2 is a section at right angles to that of Fig. 1, taken approximately on the line 2—2 of Fig. 1;

Fig. 3 is a view similar to Fig. 1, but looking in the other direction and taken approximately on the line 3—3 of Fig. 2;

Fig. 4 is a section through a part of an apparatus, similar to Fig. 1, but somewhat differently arranged; and Fig. 5 is a section on slightly smaller scale of the remainder of the construction of Fig. 4 for the total processing of the same.

Figure 1:
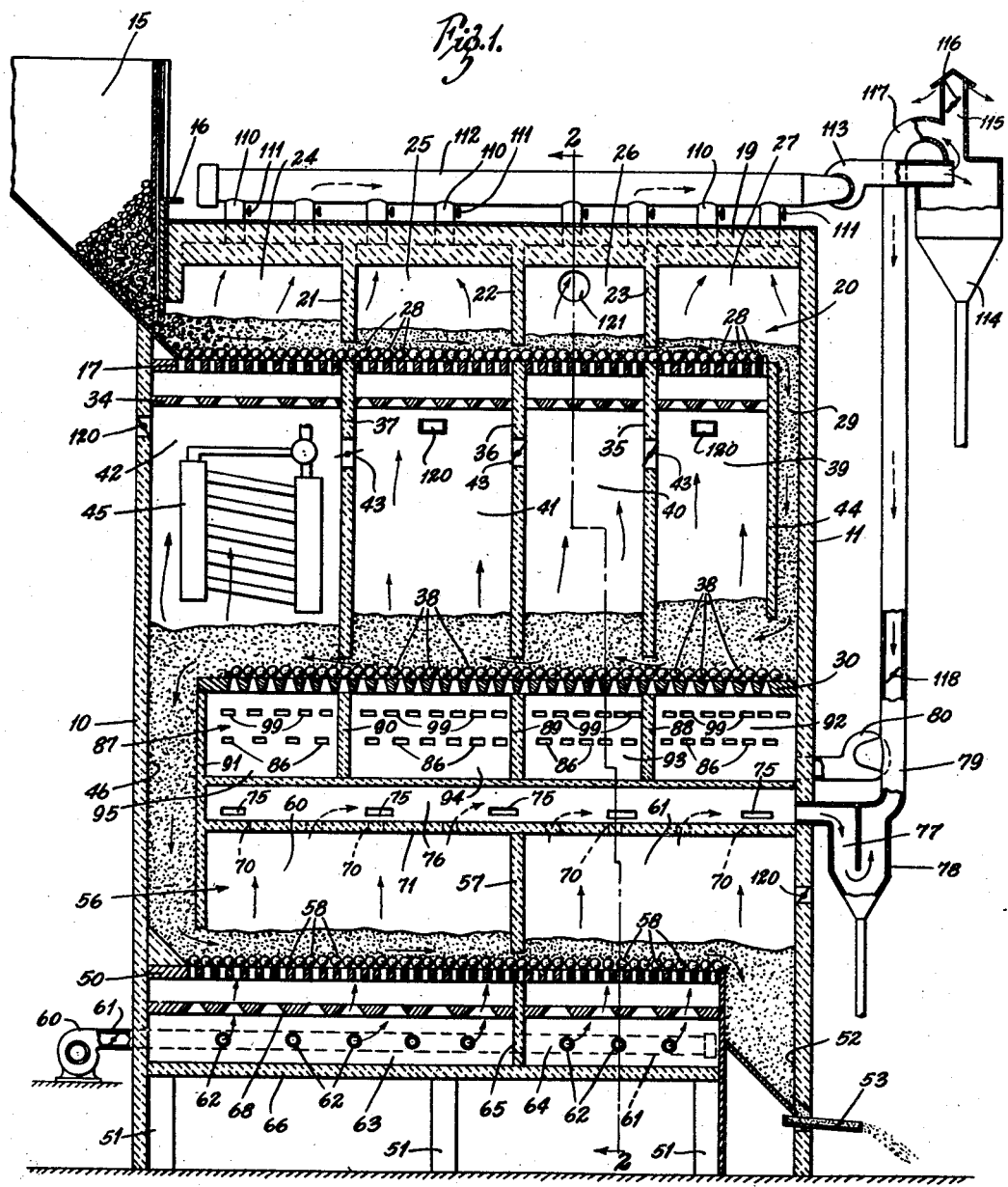
Fig. 1 is a vertical section through the construction for a typical application of the invention, taken approximately on the line 1—1 of Fig. 2.

Referring to the type of construction of Figs. 1-3, a mechanism for the practice of the invention is shown as having end walls 10 and 11, a front wall 12, and a back wall 13. These are preferably made of insulating refractory material with a retaining shell as desired.

Adjacent the top of the construction is a filling means, here shown as a hopper 15, which admits materal into the upper corner thereof. A vertically adjustable gate 16 adjusts the size of the inlet opening for use in regulating the quantity and depth of material admitted.

Below the top of the apparatus is an upper grate 17 extending from the wall 10 substantially to the opposite wall 11. The side walls 12 and 13 preferably are constricted adjacent the grate 17 (Fig. 2), and flare outwardly from a point of predetermined distance above the grate. A suitable refractory liner 18 is provided within the walls 12 and 13, it having a top closure 19. This provides above the grate an upper chamber, generally indicated at 20. However, a series of vertically depending partitions 21, 22 and 23 divide the upper section into a plurality of cells 24, 25, 26 and 27. The partitions extend downwardly to a point slightly above the grate 17, on the top of which may be placed a plurality of balls 28 for gas distribution purposes.

The hopper 15 opens into the cell 24 just above the grate 17, the inlet opening preferably extending only a limited distance above the grate. As will be shown, the material flows successively through the several cells 24—27. The remote end of the cell 27 has a discharge passage 29 leading downwardly therefrom and terminating above a second grate 30. This passage when filled forms a gas-seal between the upper chamber 20 and the chambers below it, to provide flow from one fluidizing chamber to another, in which other different fluidizing conditions may exist. The grate 30 extends leftward from the wall 11 substantially to the wall 10, and, similarly to the grate 17, is disposed within a narrowed portion 31 (Fig. 2) of the apparatus, which narrow portion is, in turn, at the bottom of a widened section 32 which tapers outwardly and downwardly from a point below the grate 17, and then inwardly and downwardly to the narrow portion 31.

The space between the grates 17 and 30 may be designated as an intermediate chamber 33. Just below the upper grate 17, there may be disposed a distribution grill 34.

A series of partitions 35, 36, and 37 depend from the upper grate 17 downwardly to just above the distribution balls 38 located above the grate 30. The partitions divide the intermediate chamber 33 into a plurality of cells 39, 40, 41, and 42, which are disposed below and substantially coequal with the upper cells 24—27. The partition 37 may be provided with a damper 43 to establish communication between the two cells 41 and 42 under certain circumstances.

The discharge passage 29 has an inner wall 44 that extends downwardly to a point somewhat above the grate 30, so that the passage 29 discharges into the intermediate cell 39. If desired, a waste heat boiler, diagrammatically represented at 45, may be located within one or more of the intermediate cells.

The intermediate chamber 33 discharges through a descending and gas-sealing discharge passage 46 opening from the left end of the cell 42. This passage is preferably larger than the passage 29 to reduce the velocity of the material flowing therethrough over that flowing through the passage 29, in order to provide a heat-soaking period for the material before rapid cooling in the cooling chamber to follow.

Beneath the grate 30, and located a substantial distance therebelow, is a lower grate 50, onto the left end of which the passage 46 discharges. This grate extends from the left wall 10 over almost to the right wall 11. It is supported by leg supports 51. At its right, it opens onto a descending discharge passage 52 emptying onto a discharge device 53 of conventional type, such as a reciprocating device which draws off the material as the device moves.

The grate 50 is disposed in a narrow portion 54, above which a gas chamber 55 flares outwardly and upwardly. These provide a lower or bottom chamber 56 divided into two sections by a partition 57 disposed substantially below the intermediate partition 36 and depending to slightly above the grate 50 and the distribution balls 58 thereon. The partition 57 divides the lower chamber 56 into two cells 60 and 61.

For certain sequence operations where gas-solid contact time must be extended or gas pressure must remain constant despite changes in particle density, stepped grates are employed which in some cases may be made adjustable. The grate in each cell may be stepped down to a lower level, so that the bed in the chamber is consecutively deepened.

All of the several sections 20, 33 and 56 are fluidizing chambers. Gases are flowed at controlled velocities and pressures through the three grates for the fluidizing actions. In general, air or other combustion supporting gas flows successively upwardly through the three fluidizing chambers. In addition, combustion gases are introduced through the intermediate grate 30 to the intermediate chamber 33. Further, waste gases from the intermediate chamber 33 are forced through the grate 17, and after being drawn from the top chamber 20 may be, if desired, in part returned to the intermediate chamber for certain controls, as will be described.

The air, as from a pump 60, is forced through a manifold pipe 611 at the bottom of the apparatus, and thence through a plurality of individually controllable outlets 62 into air chambers 63 and 64 below the grate 50. These chambers are separated by a partition 65 between the grate 50 and a bottom wall 66, disposed below the partition 57.

The individual controls for the several inlet ports 62 from the air manifold 611 are here shown in the form of damper valves 67 (Fig. 2).

The air thus discharged by the pump 60 into the air cells 63 and 64 flows through a distributing grill 68, and thence through the lower grate 50 around the balls 58 and into the material over the grate. As will appear, this air at once acts to cool the solid material, and to be heated thereby. It then may pass through ports 70 in an arched top 71 of the chamber 56 into air distribution chambers 72. The ports 70 are adjustable by dampers 73 that, in turn, are accessible through clean-out openings 74, these openings 74 being normally closed. The two air chambers 72 then discharge through a series of ports 75 into a heated air duct 76 extending the full length beneath the grate 30. The distributor chambers 72 and the duct 76 extend across the top of the chamber 56 to increase the heat withdrawal therefrom. The duct 76 discharges at one end into an air duct 77 (Fig. 1) of a clean-out separator 78 connecting with another air duct 79. The duct 79 furnishes an inlet to an air pump 80. The pump 80 discharges into a duct 81 extending coextensively with the grate but disposed at one side thereof, as shown in Fig. 2. The duct 81 opens into an upper longitudinally partitioned duct section 82 directly above the duct 81, through ports 83. These ports are disposed along the duct section 82, and are individually controllable by dampers 84 accessible through normally closed clean-out openings 85.

The several sections of the duct 82, in turn, discharge through a series of ports 86 into a combustion chamber, generally indicated at 87, but divided by partitions 88, 89 and 90, along with an end wall 91 and the right side wall 11 into a plurality of combustion chamber cells 92, 93, 94 and 95. These partitions 88—90 are continued across the duct 82, and provide the longitudinal subdivisions thereof. By the foregoing means, air in controlled quantities and by individually controlled distribution may be introduced into the several reaction cells 39—42. This air is preheated by having passed through the material in the lower section, and through the ducts 72, 76, 81 and 82 that are adjacent the combustion chamber. At the same time the air is being preheated, it is cooling the material and the ducts.

Above the duct 82 is a duct 97 partitioned similarly to the combustion chamber 87 and receiving a plurality of individually controlled oil or gas supply lines 98, where this type of fuel is used. The several sections of the duct 97 discharge by ports 99 into the various combustion and gas-mixing cells 92—95, which ports comprise fuel jets that are capable of entraining combustion air from the previously described supply.

The combustion chamber 87 (in the specific form of the cells 92—95) has clean-out openings 100 spaced therealong. Above these openings is a producer gas duct 101 extending coextensively with the combustion chamber 87 and to one side thereof. It is supplied with producer gas from an external source (not shown). It has a plurality of ports 102 by which it connects into an upper producer gas duct 103, divided by the partitions 88—90, and coextensive with the combustion chamber. Each of the ports 102 is individually controlled by a damper 104 accessible through an adjacent clean-out opening. The chambers of the duct 103 discharge into the combustion chamber 87 by a plurality of ports 105. Thus the flow of producer gas into the combustion chamber may be individually controlled for each of the cells thereof. It is expected that, in lime calcination, only one of the fuel supply means will be used at one time. Heat may be generated by burning natural or artificial gas or oil, producer gas from wood or coal, coal fired in a combustion chamber in pulverized form, or stoker fired in lumps. In other processes, the two gas inlet systems will be used to provide multiple processing gases.

The combustion gases discharged through the intermediate grate 30 pass upwardly through the material over this grate and into the several intermediate cells 39—42, being introduced in proper and individually controlled conditions for each cell. These gases react with the material in the cells, and the resulting gases pass upwardly through the grill 34 and the upper grate 17 into the material over the upper grate in the several cells 24—27. From the upper parts of the cells 24—27, a plurality of suction exhaust pipes 110 lead, as shown in Figs. 1 and 2. Each of these pipes is individually adjustable by a damper 111, and they all discharge into an exhaust manifold 112. The manifold 112 leads into the suction side of a pump 113 that discharges into a clean-out hopper 114 which has an atmospheric exhaust 115 adjustably controlled by a damper 116, and which also has a duct 117 leading downwardly past an adjustable damper 118 for connection with the pipe 79 leading into the other pump 80.

Each general section is provided with an exhaust damper 120, to be opened where the amount of gas necessary to that section exceeds the amount proper for the next section.

As will appear, the construction of Figs. 1-3 provides for a vertical battery of fluidization chambers. The vertical arrangement is of particular value from the standpoint of heat efficiency. Such chambers may, however, be arranged horizontally, where other factors are more important.

Referring to the construction of Figs. 4 and 5, there appears a horizontal arrangement of these parts of the mechanism. In Fig. 4, a horizontal kiln-like apparatus is provided with a base section 130, an inlet end wall 131, an opposite or discharge end wall 132, and a top wall 133. The base has at its top an elongated grate 134 which may be considered as divided into sections 135, 136, 137, 138, 139 and 140, each section being sized for its particular conditions. These sections may be stepped for certain situations. Partition walls 141, 142, 143, 144 and 145 divide the inner part of the apparatus into a series of fluidization cells 146, 147, 148, 149, 150 and 151. The partitions 141—145 extend downwardly to points near the top of the grate 134 or the distribution balls disposed thereover. Preferably the cells 146—151 have the flaring cross-sectional shape of the chamber 20 of Fig. 1.

A hopper 153, having an adjustment gate 154, discharges into the chamber 146, immediately above the grate 134. The material, as will be shown, successively flows through the several chambers 146—151, and finally discharges through a gas-locked discharge passage 155. There may be a partial or complete withdrawal of material at this point, but, desirably, this discharge passes the material directly into the hydrating chamber subsequently to be described.

As in Fig. 1, the overall course of gas flow is counter to the overall course of the material. Below the chamber 151 and the grate 140, there is an air chamber 160 closed by a bottom wall 161.

and by partition walls as shown. Air is supplied in controlled quantities to this chamber from a pump 162, by way of an air duct 163 and a plurality of individually controllable inlets 164 similar to the inlets 62 of Fig. 1. This air is discharged upwardly from the air chamber 160, through a distribution grate 165, and thence through the material in the cell 151, whereby the air is heated and the material is cooled. Thence the air may be drawn in desired quantities through a duct 166, by a pump 167, or may be exhausted through the atmospheric exhaust 168, controlled by a damper 169.

The pump 167 discharges the preheated air into a duct system 171, from which a plurality of individually controlled inlets 172 discharge it into the successive gas chambers 173, 174, 175, separated as shown and corresponding to the several fluidization cells 146—151.

The chambers 174 and 175 receive fuel in a manner similar to the chambers 93 and 94 of Fig. 1. This fuel supply means is diagrammatically indicated as comprising individually controllable fuel outlets 178.

The chambers 174 and 175 also receive controllable quantities of recirculated waste gases fed in from a recirculating duct 179 with separately controllable inlets 180 leading into the chambers, the amount of recirculation being dependent on the ratio of fluidizing to treating gases available for the particular process. The duct 179 is fed from a blower 181, in turn fed from a duct 182 collecting gases from the tops of the chambers 148 and 149. A waste heat boiler B may be disposed adjacent the inlet of the duct 182. When the quantity of waste gases from the cells 148 and 149 is greater than needed for recirculation, such excesses may be discharged through the damper-regulated atmospheric exhaust 183.

The chamber 173 comprises an equalizing or cleaning cell, designed to prevent short circuiting of the gases between the chambers 160—151 and 174—149. It receives heated air from an inlet 172 on the duct 171, and receives recirculated gases by an inlet 180 on the duct 179. It discharges its gases into the duct 166, or controlled quantities may be exhausted through the damper-controlled atmospheric exhaust 184.

The gases, flowing upwardly from the lower part of the several chambers 173—175, are spread by distribution grills 185, located above the waste gas inlets 180.

Ahead of the gas chamber 175 are an equalizing chamber 186 and a preheating gas chamber 187 feeding the cells 147 and 146, respectively. Both of these chambers receive recirculating gases from the duct 179 by individually controllable inlets 180. Distribution grills 188 properly spread the gases for final distribution by the grates 135 and 136.

The chamber 186 feeds the equalizing or cleaning cell 147, designed to prevent short circuiting of gases between the preheating cell and the combustion cell, and to provide a means for cleaning the material of light particles and impurities.

All of the chambers 160, 173, 174, 175, 186 and 187 have clean-out ports 190, normally closed.

It will be seen that the partitions dividing the several gas chambers correspond to the partitions dividing the several cells 146—151.

The waste gases from the cells 146 and 147 are drawn off into a duct system having a duct 192 leading from the cell 146. A branch duct 193, controlled by a damper 194, connects the upper part of the cell 147 with the duct 192. Such waste gases from the cell 147 that are not to be cleaned for recovery of material are exhausted to atmosphere through the damper regulated atmospheric exhaust 195.

The duct 192 connects through a recovery separator 196 into an exhaust pump 197, with a damper 198 provided for regulating the draft.

As noted, the cell 151 discharges into a fluidizing entrainment chamber, whenever the process causes disintegration of the particles, such as hydration of lime or dehydration of gypsum. (Such chamber is, of course, applicable to the construction of Fig. 1.) In Fig. 4, its connection with the calcination means is shown.

The fluidizing entrainment chamber has a base portion 222, end walls 223 and 224, and a top wall 225. It is understood that it is enclosed by side walls.

A plurality of partitions 226, 227, 228 and 229 divide the overall chamber into a plurality of fluidization cells 234, 235, 236, 237, and 238. The partition 226 has an angularly disposed upper baffle portion 239 having ports 240 therein. This partition 226 extends between the side walls but does not extend to the top wall 225 or down to a grate, generally indicated at 241, extending substantially the length of the apparatus. The partitions 227 and 228 comprise baffle walls extending from side to side of the apparatus, but disposed above the grate 241 and below the top wall 225. The partition 229 is divided into an upper section 243 extending downwardly from the top wall, having a flaring extension 244, and a lower section 245 extending downwardly to just above the grate 241, as shown.

The cells 235 and 236 are provided with downwardly extending baffle walls 246 and 247, disposed between the partitions and operating to deflect gas flow toward the grate.

Beneath the grate 241 are a plurality of individually controllable gas chambers 248—254, separated by partitions to dispose the gas cells 248 and 249 beneath the fluidizing cell 234, the gas cell 250 below the cell 235, the gas cells 251 and 252 below the cell 236, the gas cell 253 below the cell 237, and the gas cell 254 below the cell 238. As for hydration of lime, fluidizing, temperature-controlling, and dust-entraining air is forced by a pump 255 into a duct 256 having individually controllable inlet ports 257 opening into the several chambers. Additionally, a steam supply line 258 is provided with individually controlled steam jets 260 leading into the several chambers 248—253. The branch line 259 likewise has a plurality of individually controlled steam jets 261 leading into the top of the various cells 234—237. The steam jets do not pass into a final fluidizing gas chamber 238, which merely receives heated, dry air from the manifold 256.

Gases from the final cell 238 are exhausted off into two series collectors 262 and 263 discharging onto discharge devices 264 and 265, respectively. Suction is put onto the two collectors by a pump 266.

The heated air discharged by the pump 255 may be drawn from the line 77 of Fig. 1, or the line 197 of Fig. 4. The steam may be drawn from the boiler 45 of Fig. 1, or the boiler 143B of Fig. 4.

*Operation*

The operation of the process will be explained concurrently with the explanation of the operation of the mechanism hereof; and the description will involve the calcination of limestone, which illustrates the general practice of the process and operation of the apparatus, as well as a new invention of itself.

At the outset of the discussion of the operation of the present invention, a background knowledge of factors governing fluidization is required.

Fluidization is the state of equilibrium in which a suitable mass of solid particles is held in partial suspension and extreme agitation by a suitable stream of gas flowing through it. The physical properties of this gas-agitated mass closely approach those of a fluid. This partial suspension is distinguished from the entrainment of the small solid particles into a flowing stream of gas, as the present system contemplates the maintenance of a definite fluidized bed, usually with no entrainment from the bed, although, for certain operations, some entrainment is effected, drawing material away from the fluidized bed.

The fluidized bed is at an intermediate stage between a static bed of solid particles and an entrained flow of solid particles. As the velocity of a given gas through a laterally confined mass of solid particles is raised, it reaches the stage wherein, as between adjacent particles, its flow is constricted and its component velocities at such constrictions thereby increase at least momentarily to values sufficient to lift particles subjected to them. As the gas leaves these small constrictions, its velocity again decreases below a lifting velocity, and the lifted particle drops until again elevated by what may be considered a small gas jet, resulting from another constriction. This jet effect is multiplied by the innumerable small passages through the fluidized bed. When the gas reaches the top surface of the bed, it is relieved of all of this constriction, and its velocity decreases to a value below the lifting velocity of the particles. The top surface, though irregular as would be expected, is definite. The depth of the bed is increased substantially over the depth of the static solid mass, the actual depth being determined by the effective velocity head, which may be varied between a value giving only a low energy fluidization and a value giving a higher energy level of fluidization, with, if desired, accompanying entrainment. The difference in characteristics of a bed fluidized by a high velocity gas and one fluidized by a lower velocity gas may be likened to the comparative characteristics of a low viscosity liquid and a high viscosity liquid, or of a low density liquid and a high density liquid.

The bed of fluidized solids thus obtained has many characteristics of a liquid. It will flow by gravity, as will a liquid. In the present invention, use has been made of this fact by confining the bed into a stream path, by limiting its lateral escape to predetermined sides of its container walls, and especially by providing a series of such cells with an overall flow from one to the next.

It will be evident that the gas velocity applied to the solid bed will, by increasing the depth of the fluidized bed without the addition of more solid material, decrease the bulk specific gravity of the fluidized bed (as distinguished from the specific gravity of the bed in static condition). This fact is employed in the present invention, as will appear.

In any given fluidizing cell, employing a chosen mass of fluidized, solid particles, velocity is substantially independent of the depth of the material. The gas pressure must be great enough to effect the momentary lifting of the particles. Its lifting force is a function of its speed and its mass. The resistance of the particles to the pressure is a function of the weight, shape, and surface characteristics of the particles. As the constriction of the gas flow that elevates its velocity from below to above lifting velocity results from the constricting effect of the particles themselves, the required gas velocity varies with particle size. For turbulent flow in this range, the lifting velocity varies as the square root of particle size and density, and inversely as gas density. It is, of course, necessary to have available a gas pressure sufficient to produce the required velocity. This gas pressure must be sufficient at the start to elevate the static mass of particles. It varies as the height of the static bed, the latter being a function of the mass of the solid material.

While the fluidizing pressure conditions can always be readily determined by brief trial and adjustment, the foregoing known functions furnish the basis for computations by which they may be plotted.

In the present invention, use is made of the flow properties of fluidized material. Among other advantages of this is the fact that, by using an extended relatively shallow bed, the required gas pressure is very much reduced, and hence the cost of operation is lowered. Referring first to Figs. 1–3, material, consisting of small sized particles such as ½″ or less (although, in general, it may be said that any size particles capable of fluidization may be used, the usual range being 6-mesh down to fines), is introduced into the hopper 15. It will flow by gravity from the hopper onto the grate 17 in the cell 24, which will have fluidizing gas running through it, and the material will become fluidized. When so fluidized, it acts as a liquid confined on four sides and at the bottom, except for the passage beneath the partition 21. As a liquid would do, it flows beneath the partition, and discharges into the second cell 25. As will appear more fully, this discharge to the next cell is accompanied by an input of more material from the hopper. Similarly, the second cell discharges into the third, and so on, until the material is finally withdrawn from the system by some discharge means, such as the discharge device 53.

Referring further to the feed of material from the hopper 15 into the cell 24, the feed opening is so located that the material can readily flow out by gravity, but the stream of inflowing material intersects the fluidized bed in the cell 24, and thereby is held back by hydrostatic pressure of the fluidized bed. This pressure depends both on the bulk specific gravity of the fluidized mass and its height above the feed opening. For any particular gate level and fluidizing gas pressure conditions, a hydrostatic pressure in fluidized bed height is automatically reached in the cell, that prevents further sliding in of static material from the feed hopper. Whenever this fluidized bed height is lowered slightly by removal of some of the solids, the fluid bed pressure and the static material pressure in the feed opening become unbalanced, and material again slides into the fluid bed from the static bed, until another balance is reached or at a continuous rate, depending on the discharge rate.

If the gate level is raised, a larger quantity of material may enter the cell 24, possibly requiring greater fluidizing pressure to maintain the desired fluidization. This larger input will increase the depth of solid particles within the cells.

If fluidization is at a high energy level, that is to say, if sufficient gas is available to maintain a low density fluidized mass, the bed surface is generally above the feed gate opening. Depending upon the rate of movement, there may or may not be a distinct surface gradient. If fluidization is at a low energy level, the bed surface level is not likely to be above the gate opening, but generally below, and a more distinct gradient is noticeable, due in part to the volume of material sliding into the bed and subsequently becoming fluidized. The gate opening must be disposed relative to the top of the bed so that variations in the bed height and the hydrostatic pressure in the bed may act directly upon the inflowing stream. In other words, the material from the supply must slide in to a point where it can reach the fluidizing grate, during fluidization within the cell. The degree of intersection of the stack of material entering the cell with the fluidized bed is controlled by varying the height of the gate.

Since the solid material flows into the apparatus only at the gate 16, and is discharged at only one point, any change in rate of discharge of solid material will necessarily be reflected back to the point of input. At the beginning of an increase in rate of discharge from the last cell 61, there will be a decrease in the bulk hydrostatic head of the material within that cell, owing to the reduction in the volume of solid material therein and consequent reduction of the head of the fluidized mass. Such reduction in hydrostatic head within the cell 61 will decrease the resistance to inflow of material from the cell 60, and hence will increase the rate of flow to the cell 61. The reduction of material in the cell 60 will be followed by increased intake from the passage 46 in a manner similar to the inflow from the hopper 15 to the cell 24. This, in turn, will increase the discharge from the intermediate cell 42. In like manner, the rate of flow from one cell to the next will be increased all the way back to the first cell 24. As heretofore noted, this last will automatically produce an increase in the rate of inflow of solid material from the hopper 15 to the cell 24. This increase in withdrawal of material will reestablish equilibrium conditions throughout the apparatus, but with an increased rate of flow therethrough. The adjustment of rate of inflow is normally rapid, after adjustment of the rate of discharge. By this means, the rate of inflow is automatically a function of the rate of discharge.

In discussing the hydrostatic pressure heads in the several cells, it is to be kept in mind that the bulk pressure heads of the fluidized stream are not necessarily direct functions of material depth, but are, rather, functions of material depth and of the bulk specific gravities of the masses. The bulk specific gravity of a fluidized mass is not the specific gravity of the solid, but is a function of the density of the fluidized mass. Hence, by increasing the fluidizing velocity in any cell containing solid material of given density, the depth of the fluidized mass may increase, but the bulk specific gravity lessen. This characteristic may be employed in the present system when it is desired for any reason to increase the fluidizing pressure in some cell, or to reduce the density of the fluidizing mass, as when the gas-solid contact factor is to be adjusted. Such change in the level of the mass in any cell does not deter the overall flow in the stream, because it is accompanied by reduced bulk specific gravity in such cell.

Referring again particularly to Figs. 1–3, and assuming that the process has started, that material in course of being processed occupies the grates over all of the cells as aforesaid, fresh air will be discharged into the chambers 63 and 64 beneath the lower grate 50. This air passes upward through the grate and into the material over it under the pressure required to produce the velocity as to fluidize the solid particles, producing a bed of material that flows with the characteristics of a stream. Very close and intimate contact between each of the particles and the fluidizing air is thus attained. In these cells, this contact obtains superior heat transfer, as the solids entering therein are hot.

As the air is drawn upwardly into the upper portions of the two cells 60 and 61, its linear velocity decreases, partly because it is no longer constricted to a narrow cross section by the volumetric displacement of the fluidized material and partly because the chambers flare, as shown at 55 in Fig. 2, thus reducing the velocity. Hence, the air above the mass of material has insufficient velocity to fluidize the material, and, therefore, will not entrain any substantial amount of the material itself. Indeed, this reduction of velocity aids fine material that otherwise might inevitably be entrained, in dropping back.

The air, flowing through the lower grate 50, may have a different pressure below the chamber 60 than below the chamber 61 to accommodate any variation in the material as it progressively cools, in order to maintain the fluidizing velocity proper. Also, as this material in the cell 61 is at a lower temperature, it may be desired to alter the gas-solid contact period by varying the intensity of fluidization. This individual control is made possible by the presence of the partition 57 which extends down into the mass of material, and the corresponding partition 65 separating the two air chambers 63 and 64, so that individual control can be had.

The air passing through the grate 50 is heated by its contact with the material, which thereby is cooled. Both results are desirable.

Air is discharged from the chamber 56 through the ports 70 into the ducts 72. The size of the ports 70 is controllable by the dampers 73. These dampers control the amount of hot air drawn from the cells 60 and 61, with adjustment for the difference in conditions between the two cells. The air then is discharged from the duct 72 through the ports 75 into the duct 76, whence it is drawn by the pump 80 into the duct 77. It loses much solid material which it has entrained by striking the baffles in the collector 78, and this material may be returned to the discharge. It is then drawn by the pump 80 from the collector 78 by way of the duct 79, and is discharged from the pump 80 into the duct 81 running the length of the intermediate grate 30. This duct discharges through individually controllable ports 83 into the several chambers of the duct 82, which chambers correspond to the chambers 92—95. From these chambers, it is discharged out through the ports 86 into each of the combustion chambers 92—95. Adjustment of the ports 83 provides distribution of the proper amount of these gases for each of the combustion chambers.

The air, being relatively cool, thus not only becomes preheated and cools the material on the lower grate, but also provides a cooling medium for the walls below and at the sides of the combustion chambers.

At the same time the air is discharged into the combustion chambers 92—95, fuel, which may be oil or natural gas, is introduced through the several pipes 98 into the duct 97 which is divided correspondingly to the several combustion chambers. This fuel is individually adjusted to the conditions in each of the combustion chambers, and flows into the combustion chamber through the ports 99 for mixture with the preheated air.

The fuel may thus be discharged into the combustion chambers to burn therein, or it may be injected into them for mixing with combustion supporting gases, and perhaps others, and for subsequent discharge through the grate and for combustion within the bed of material being treated. In some instances, it is desirable to mix finely divided solid fuel material with the particles being treated, so that completely distributed combustion occurs throughout the mass.

Where producer gas is used, it is introduced through the duct 101, open the length of the grate 30, and communicating through individually controllable ports 102 into the several chambers of the duct 103 which is divided lengthwise correspondingly to the several combustion chambers. Producer gas is emitted by the ports 105 into the combustion chambers. Where coal is burned pulverized or by stoker firing, the most of the preheated air is used for combustion in a combustion chamber not shown, and the products of combustion led through the duct 101 and the ports 102 and 105 to the distributing chamber where it may pass through the fluidizing grate per se or with recirculated waste gas.

Whichever fuel is used, it is mixed with the preheated air within a combustion chamber such as 81, and is given proper fluidizing pressures and conditions adapted to the individual combustion cells. It then discharges through the various sections of the grate 30 into the material above this grate, where it reacts with the material over the grate.

Assuming that this is a limestone calcination operation, it will be recognized that the material must be heated to a point wherein it will give off carbon dioxide, and it must be supplied with the heat required for this endothermic reaction. The material entering the first cell 39 is limestone, preheated from the grate 17. The material leaving the last cell 42 is calcined lime. As the material flows through the several cells, it attains its calcination temperature and then reacts. In this reaction, $CO_2$ is given off to the fluidizing gas stream, and the specific gravity of the solid particles is reduced. The primary function of the cell 39 is to increase the temperature of the material therein to bring it up to the approximate 1650° F. required for calcination, although some calcination takes place in this cell. As the material does calcine, its losses in specific gravity occur, so that the material in the next cell 40 is somewhat lighter, and the surface level in each successive cell may be higher but of reduced hydrostatic pressure. In this cell 40, a greater amount of calcination takes place. In the cell 41, the process is almost wholly calcination, and in the cell 42 the material is, for all practical purposes, at a uniform calcining temperature, and the combustion gases merely perform the function of maintaining the heat necessary to complete the chemical change.

The function of the combustion gases, therefore, is three-fold with respect to the intermediate section 33 comprising its four cells. Its first function is to have the velocity head required to fluidize the material. Its second function is to supply the heat necessary to bring the material to a calcinating temperature. Its third function is to supply the heat necessary for the calcinating reaction. The three functions vary from cell to cell in this section. Hence, individual control of the combustion gases as to velocity and temperature is required. For example, the pressure required to attain the velocity in the gas to fluidize the heavy and relatively deep mass of material within the cell 39 would produce so high a velocity in the lighter and shallower material in the cell 42 that the gas could entrain material from the cell 42, which, of course, is not desired. Hence, the pressure is reduced in the successive combustion chambers 92—95. This may be overcome, if so desired, by using successively lower stepped grates for each cell, thereby increasing bed depth as the bulk specific gravity decreases. Furthermore, the intensity of the heat in the chamber 39 is greater than that necessary in the chamber 42 because of the difference in proportion of the function of bringing the material up to calcining temperature and the function of actually calcining. Therefore, the ratio of fuel admitted is individually regulated in the several cells, or the ratio of combustion gas to waste gas is adjusted.

It may be observed that the material is narrowly confined where the fluidization occurs, by being disposed in the constriction 31 above the grate 30. When the gases of combustion, mixed with the $CO_2$ obtained from the material, move upwardly into the widened portion 32 of the several cells, the mass velocity decreases and entrainment is broken.

These hot gases may be used, after their function of calcinating, for heating the boiler 45. They are subsequently discharged upwardly through the upper grate 17 into the cells 24—27, corresponding to the cells 39—42. The material within these upper cells is uncalcinated and cold. These waste gases are employed to preheat this material, the hottest gases being applied to the coldest material. Since the volume is most in the cells 39 and 40 before the most deeply filled cell 24, additional gases may be drawn through the dampers 43 in the partitions 35, 36, 37 to build up the volume and velocity head of gas passing through the material in that cell. These gases also perform the function of fluidizing the material within the upper cells, so that it flows at the same time it is being heated.

The waste gases are finally drawn off by the pump 113 into the manifold 112 and discharged into the collector 115. Ordinarily, it is desirable to divert some of these gases back through the line 117 into the pump 80 for re-mixture with the combustion gases, thereby to dilute them and reduce their temperature. Also, if the amount of air discharged through the lower cells is insufficient to attain the proper fluidizing velocities in the intermediate cells, though sufficient to sustain the combustion properly, the waste gases may be employed to increase this velocity. They also add heat to the combustion gases, thus having a preheating effect. It is equally evident that other reacting gases could be mixed with the combustion gases, as well as the inert, or relatively inert, waste gases. Unlike all other heat-treating apparatus in which all gases intermingle and escape together, the gases are not mixed until they enter the duct 112, and so the present invention allows withdrawal of special composition gases from any of the cells. The withdrawal duct 121 is shown for purpose of illustration through which high $CO_2$ gas may be collected for dry ice manufacture or other uses when the treated ore is a carbonate like limestone.

In the foregoing discussion, it has been shown how fluidization is effected over each of the three grate sections. When the material is thus fluidized, it flows with certain characteristics of a liquid. While the various partitions separate the cells, they do not destroy the overall flow from one cell to the next of each of the grates. Thus the partitions terminating above the grates may be used for the individual control of various sections of material over the grate without preventing employment of the overall flow of material as an open stream.

The several cells are sized to suit their particular functions. Thus, in the intermediate stage, the partitions are disposed to separate the material into the proper number of stages of calcination to obtain the particular gas velocity and gas composition suitable to the material as it progressively reacts.

The length of time the material is subjected to a specific phase of treatment is a function of the size of the cells specifically giving that treatment. This follows from the fact that the linear velocity of the material relative to the grate is, as has been shown, a function of the rate of discharge.

The material finally discharging at 53 is already cooled by the new air introduced under the grate 50 and is dry. It then may be drawn off in whole or in part as dry material, or may be introduced into the hydrating chamber, as will be described.

In the construction of Figs. 4 and 5, the preheating calcination, cooling and rehydration steps all occur along a horizontal grate. The partitions divide the material into separate cells wherein the individual operations may take place.

As seen, the material flows left to right from the hopper 153 through the apparatus. The cells 146—151 are here shown as preheating, calcinating, and cooling cells, and the cells 234—238 are rehydrating cells. The general course of the gases in each group of cells is from right to left. In the first cell group, air is introduced by the pump 162 through the outlets 164 into the air chamber 160 in such wise as to attain proper fluidization of the material over the grate 140. It fluidizes this material, cools the same, and is itself preheated. This chamber may be subdivided to correspond to the bottom chamber 56 of the former type, if desirable.

The heated air then is drawn by the pump 167 into the duct 166, or, if more air is required for the functions of the cell 151 than is needded in the calcinating cells, the excess may be exhausted at 168, thus corresponding to the exhaust 120 of the cell 61 of Fig. 1.

The cell 173 next back of the cell 160 is an equalizing or cleaning cell. It receives hot waste gases, and also some of the preheated air. The hot waste gases are introduced through the controlled inlet 180, and the preheated air is introduced through the controlled inlet 172. A relatively high velocity may be desirable in this cell 150 to entrain and draw off any finer material or dust separately. Hence its fluidized surface level may be above those ahead of it and after it. Also the high pressure resists bypassing of the fluidizing gases from the cells ahead of and after this cell. This cell discharges its gases into the duct 166, or, if desired, and in desired proportion, from zero to total, through the atmospheric exhaust 184.

The material in the cells 148 and 149 is being calcined. These two cells are comparable to the intermediate cells 39—42 of Fig. 1. It will be seen that both of these two cells receive preheated air from the pump 167 through the line 171, and the various individually controlled inlet ports 172. These cells similarly receive fuel through the ports 178 and exhaust gases through the ports 180. The partition 143 divides the calcination operation into two divisions, representing the phase wherein the material must be brought up to calcinating temperature, and, if desired, partly calcinated, and the phase where the primary purpose of the heat is to effect the chemical reaction. As in Fig. 1, the combustion temperature and gas velocity must be individually adjusted to suit the conditions of each of these two cells. The cell 148, in brief, may be called the calcination or reaction chamber, and the cell 149 the heat soaking chamber. The waste gases from these two cells 148 and 149 are drawn off through the duct 182, heating the boiler 183. Where steam is not required, cooling air may be admitted through an inlet 199 in the duct 182 so that temperature of the pump 181 can be held below a critical maximum. In that case, less air from the pump 162 will be needed for combustion. The pump 181 draws off the waste gases, and discharges these gases back into the manifold 179, and out the several outlets 180. As before, the outlets 180 under the cells 148 and 149 are primarily for the functions of insuring adequate gas for fluidization, and of controlling the temperature of the combustion. If the waste gases are not desired for this recirculation, they may be exhausted in whole or in part through the atmospheric exhaust 183. As in Fig. 1, high strength $CO_2$ gas may be withdrawn from the cell 148 for $CO_2$ manufacture.

The waste gases, discharged into the chamber 187 below the cell 146, are used to fluidize the material in the chamber 146 and to preheat this material. Similarly, these gases discharge into the chamber 186 below the equalizing or cleaning cell 147, where they preheat this material, draw off the dust, and prevent short-circuiting between the gases flowing through the grate into the cell 146 and the combustion gases flowing through the grate 137 into the cell 148. The waste gases drawn off from the cells 146 and 147 are then passed through the separator 196 and exhausted. Any excess gases in the cell 147 may be exhausted to atmosphere through the atmospheric exhaust 195.

Thus, in Fig. 4, the material is preheated in the cell 146, is brought up to temperature and is partially calcinated in the cell 148, is completely calcinated in the cell 149, and is cooled in the cell 151, from which the calcined lime discharges through the discharge port 155. In general, the mechanism shown by Fig. 4 is better suited for processes requiring lower reaction temperatures, while that indicated by Fig. 1 is more suitable to higher temperatures. This is due mainly to the novel method of using suction above the fluidizing grate 17 to draw gases which are too hot to be handled by a fan or pump, through the cool incoming raw material at sufficient vacuum and volume to fluidize and preheat the material properly.

The material is introduced from the foregoing calcining mechanism into the hydrating mechanism, shown partly in Fig. 4, and completely in Fig. 5. Herein, it flows over the grate 241 successively into the cells 234—238. Steam is introduced into the line 258 from either of the waste gas boilers, or from an outside steam source if necessary. This steam is discharged into the fluidizing air forced into the several gas chambers 248—253 by the pump 255. This fluidizing gas normally is air, but it may be waste gas from the preceding stages, such as $CO_2$ gas for a subsequent reducing reaction or recarbonation of oxide. The material is fluidized in each of the several cells by this gas mixed with steam. The gas pressure is adjusted to the conditions of each cell and the specific gravities of the material as it successively flows into the several cells.

The hydrating operation typifies those processes having a definite fluidized bed, plus an entrainment therefrom, such as those that treat products the physical nature of which changes with the reaction in size and density, with an end product of powdery material. In these cases, the fluidizing gases fluidize the material and provide an intimate association therewith, of the reacting chemical, here steam. When the material reacts and disintegrates to very small particles, the fluidizing gas entrains it and carries it out of the fluidized stream, leaving in that stream the non-reactive components that remain fluidized and finally pass out at the discharge end. Meanwhile the entrained products are further mixed with the steam, being directed thereinto by their flow past the various baffles and partitions. These products are finally carried into the separators and the solids separated out from the gases.

By this arrangement, the limitation on the amount of air and steam that can be introduced into the fluidizing bed, namely, that it must not entrain the non-reactive components, is counteracted by the further introduction of steam from the top jets 261. Thus Fig. 5 typifies a system in which the open stream principle is applied to conditions requiring at least partial entrainment and in which the inherent limitations on fluidizing velocities and pressures are such that a complete reaction could not be obtained by the sole use of fluidizing gases.

During the course of the flow through the successive cells, the material being fluidized reacts more and more to yield the hydrated lime. Also, as the less reactive components reach the later chambers, they are increasingly subjected to more intense treatment, along with an increased time factor, the latter being accomplished by either increasing the width of the bed or stepping down the grate level to obtain a deeper bed. It is preferable, as shown, to use the last chamber 238 as a drying chamber, when the fluidizing gas is hot or dry air to facilitate dust collection and removal of foreign objects.

The partitions provide successively larger gas passages to keep gas velocities constant or controlled despite successively increasing gas volume.

The foregoing fluidizing apparatus may be of the vertical type as well as the horizontal one. It operates at relatively low temperatures, so that, in most instances, metal construction may be used. It provides the open stream fluidized flow, subdivided for individual zone control. It provides rapid movement of the particles and low bulk specific gravity of the mass, so that localized and irregular heating is eliminated. It has reduced losses, and made possible more even and rapid heat transfer, and more complete reactions. It is rapid, as the apparatus provides its own separator, and products removers.

Thus the entrainment fluidizing chamber typifies an apparatus and process for applying a combination of fluidizing and entraining to the open stream bed principle, especially with zone control. Other uses of this type apparatus include hydration of dolomite, drying of moist or wet particles, dehydration of gypsum to plaster of paris, and the like. Generally, a more intense fluidizing gas current is employed with narrow non-flaring chamber sides immediately above the fluidized bed.

It is fairly obvious that draw-offs can be made at desired points within the system. To illustrate, draw-offs could be made after the cell 151 of Fig. 4, or from the cell 61 of Fig. 1. Of course, if uncooled lime were needed, it could be drawn off ahead of the cell 60. Also, the system is not limited to disposition of the fluidized bed in straight lines, as circumstances may make it desirable to run it in irregular directions. While the description has shown one continuous stream, it is equally true that branch streams undergoing individual processing may be merged together for joint processing.

Although Fig. 1 was described as used with a mechanical discharge device, the automatic regulation of intake by adjustment of discharge is equally effected by other discharge means, such as the combination of entrainment and mechanical discharge of Fig. 5. This reflects in a certain withdrawal from the cell 151 that will be carried back to the cell 146 and at that point will effect a corresponding intake.

The fluidizing apparatus in the foregoing description is gas-tight. This may be accomplished by using welded steel constructions and gas pressure sealed doors. Since very little weight of treating material is involved, the linings may be almost wholly made of insulating refractory brick with an inside lining coat (as at 18, Fig. 2) of plastic monolithic refractory cement. Fluidizing grates are of heat-resisting alloys or castings for lower temperature zones, or special silicon carbide slabs of minimum thickness for combustion grates. As in Fig. 1, heat conservation may be accomplished by incorporating the gas ducts into the walls of the apparatus. The regulation of temperature and reaction time may be made automatic by using pyrometer and pressure controls for the various dampers, the feed and the discharge devices.

The equally sized spheres above the grates provide smooth surfaces of low friction with even passages that prevent gas channeling. They are made of polished cast iron for the lower temperature grates, and of porcelain or other refractory for the higher temperature grates.

Each of the steps in the process and apparatus above described employs fluidizing to its fullest extent in an open stream. Each attains maximum efficiency in the gas-solid reaction, or gas-solid heat transfer, as the gas immediately reaches each particle to effect reaction or heat transfer directly. Since the gas or the heat need not penetrate a bed of materials but only each particle individually, and since the time factor of exposure is materially reduced, large output at minimum heat loss is realized.

The system provides successive treatment of material without disadvantageous mixing of more and less treated portions of it.

What is claimed is:

1. A process for use in treating materials, comprising admitting solid material in fluidizable particles onto a base, discharging fluidizing gas through the material to establish a fluidized bed, withdrawing material from the bed at a point spaced from the point of admission, separating the bed into a plurality of fluidizing zones while maintaining the fluidization of all the material between the points of admission and withdrawal, reacting the fluidized material to change the specific gravity thereof as it flows along the bed, and separately adjusting the fluidization gas pressure and velocity conditions individually in the zones to maintain all of the material of all specific gravities fluidized.

2. A process for use in treating materials, comprising admitting solid material in fluidizable particles onto a base, discharging fluidizing gas through the material to establish a fluidized bed, withdrawing material from the bed at a point spaced from the point of admission, separating the bed into a plurality of fluidizing zones without breaking the fluidized flow of material between the points of admission and withdrawal, and separately adding a heat-changing component to the fluidizing gas in at least one of the zones, and thereby regulating the temperatures in the several zones individually.

3. A process for use in chemically reacting gas and solid material in small particles, in a manner to obtain change in specific gravity of the solid material, including passing a fluidizing gas through a bed of fluidizable material, between an inlet and an outlet from said bed, fluidizing the material thereby, controlling the hydrostatic pressure head of the fluidized material between the inlet and the outlet to obtain flow of the material along the bed from the inlet to the outlet, effecting combustion of said gas to apply heat to the material while fluidizing the same, chemically reacting said fluidized material by said combustion gas changing the specific gravity of the solid material by the chemical reaction, as the material progresses toward the outlet, and adjusting the pressure and velocity of the fluidizing gas along said bed in the direction of flow to accommodate the changes in the solid material as the chemical reaction takes place.

4. A process for use in treating materials, comprising passing fluidizing gas through a bed of fluidizable material between an inlet and an outlet, fluidizing the material thereby, and causing it to flow between the inlet and the outlet, separating said bed into a plurality of zones without breaking the flow of material between the inlet and the outlet, separating the fluidizing gas into zones corresponding to the zones of the bed, and separately controlling the fluidizing gas conditions in said zones, and providing a gas-locked flow of material from one zone to another.

5. A process for use in treating materials, comprising providing between an inlet and an outlet a bed of fluidizable material subject to chemical reaction upon attainment of a predetermined temperature, with attendant change in pressure head of the fluidized mass, as the chemical reaction proceeds, separating the bed into a plurality of zones, applying fluidizing gases separately to each zone to fluidize the material over the bed as a whole and to obtain flow of the material from inlet to outlet unbroken by the zoning, elevating the temperature of the material by the fluidizing gas in one zone, effecting the reaction by the fluidizing gas in a subsequent zone, and adjusting the gas conditions in said zones to accommodate the changes in the material and to maintain fluidization despite such changes.

6. A process for use in treating materials, comprising providing between an inlet and an outlet a bed of fluidizable material subject to chemical reaction upon attainment of a predetermined temperature, with attendant change in pressure head of the fluidized mass, as the chemical reaction proceeds, separating the bed into a plurality of zones, applying fluidizing gases separately to each zone to fluidize the material over the bed as a whole and to obtain flow of the material from inlet to outlet unbroken by the zoning, elevating the temperature of the material by the fluidizing gas in one zone, effecting the reaction by the fluidizing gas in a subsequent zone, adjusting the gas conditions in said zones to accommodate the changes in the material and to maintain fluidization despite such changes, drawing off the fluidizing gas from said zones, and passing it through the material ahead of the said one zone to fluidize and preheat the same.

7. A method for reducing ores, comprising charging a bed of ore of fluidizable sized particles at one point and withdrawing reduced ore at another point separated from the first to provide a bed therein, fluidizing the material in the bed, dividing said bed into a plurality of separate zones without breaking the fluidized flow between the charging and withdrawal points, and separately regulating the conditions of the fluidizing gases in said zones to provide fluidizing of the ore, heating thereof, and reducing thereof as it flows through the zones.

8. A method for reducing limestone ores, comprising charging a bed of limestone ore of fluidizable particles at one point and withdrawing reduced limestone ore at another point separated from the first to provide a bed therebetween, fluidizing the material in the bed, dividing said bed into a plurality of separate zones without breaking the fluidized flow between the charging and withdrawal points, and separately regulating the conditions of the fluidizing gases in said zones to provide fluidizing of the limestone ore, heating thereof, and reducing thereof as it flows through the zones.

9. Apparatus for use in treating fluidizable material, including a support member having fluidizing gas ports therein, means about the support to provide lateral support for material thereon, inlet means to admit fluidizable material to the support, means extending from the inlet to outlet means to conduct a fluidizing gas through the ports into the material to provide a continuous fluidized bed, outlet means as aforesaid spaced from the inlet means to contain the bed between the two, and to cause the material to flow with characteristics of a liquid from the inlet to the outlet, and dividing means adapted to extend down a substantial distance below the surface of the fluidized material to separate the fluidized bed into a plurality of separately treatable sections, without breaking the fluidized flow from the inlet to the outlet, said dividing means providing submerged ports for flow of material from one zone to another, and providing means to confine the fluidizing gas in individual sections.

10. Apparatus for use in treating fluidizable material, including a support member having fluidizing gas ports therein, means about the support to provide lateral support for material thereon, inlet means to admit fluidizable material to the support, means extending from the inlet to outlet means to conduct a fluidizing gas through the ports into the material to provide a continuous fluidized bed, outlet means as aforesaid spaced from the inlet means to contain the bed between the two, and to cause the material to flow with characteristics of a liquid from the inlet to the outlet, and dividing means to separate the fluidized bed into a plurality of separately treatable sections, without breaking the fluidized flow from the inlet to the outlet, comprising a partition adapted to extend down into the bed of material but providing an opening below the surface of the material when fluidized, and adjacent the bottom of the fluidized material.

11. Apparatus for use in treating fluidizable material, including a support member, means about the support to provide lateral support for material thereon, supply means of capacity to supply material to the support at rates greater than the operating rates of the apparatus, inlet means to admit fluidizable material from the supply means to the support, means to conduct a fluidizing gas through the material to provide a fluidized bed, outlet means spaced from the inlet means to contain the bed between the two, and to cause the material to flow with characteristics of a liquid from the inlet to the outlet, and means to regulate the rate of inflow and outflow of the material into and from the bed, said inlet means including an inlet opening disposed adjacent to the support so as to let material flow from the supply means onto the bed with a component of force laterally of the bed, and to intersect the bed, whereby the fluidizing gas conditions and the fluidized bed may produce an opposing force against said lateral component, and an equilibrium between said forces may be established for a particular height of fluidized bed at predetermined gas conditions.

12. Apparatus of the channel-flow type for use in fluidizing, including a support member, means about the support to provide lateral support for material thereon, the support member and lateral support means providing a compartment of channel type inlet means to admit fluidizable material to the support, means to conduct a fluidizing gas into the material to provide a fluidized bed, outlet means spaced from the inlet means to contain the bed between the two, and to cause the material to flow laterally with characteristics of a liquid from the inlet to the outlet, and means reducing the cross section of the channel-type bed adjacent the support member, to provide relatively high gas velocity therethrough, and means above the reduced section to enlarge the effective cross section of the bed, to reduce the gas velocity thereat.

13. Apparatus of the channel-flow-type for use in fluidizing, including a support member, means about the support to provide lateral support for material thereon, the support member and lateral support means providing a compartment of channel type inlet means to admit fluidizable material to the support, means to conduct a fluidizing gas into the material to provide a fluidized bed, and outlet means spaced from the inlet means to contain the bed between the two, and to cause the material to flow laterally with characteristics of a liquid from the inlet to the outlet, said material support means being spaced relatively closely to provide a narrow cross section and thereby constrict the flow of gas through the bed, but spreading outward above the bed to reduce the gas velocity.

14. Apparatus for use in treating fluidizable material, including a support member, means about the support to provide lateral support for material thereon, inlet means to admit fluidizable material to the support, means to conduct a fluidizing gas into the material to provide a fluidized bed, outlet means spaced from the inlet means to contain the bed between the two, and to cause the material to flow with characteristics of a liquid from the inlet to the outlet, dividing means to separate the bed into a plurality of separately treatable sections, providing submerged ports below the fluidized surface and sized to confine the fluidizing gases, without breaking the material fluidized flow from the inlet to the outlet, and means to separate the fluidizing gas conducting means into a plurality of separately controllable sections to individually treat therewith the material in the several sections of the bed.

15. Apparatus for treating fluidizable materials, including three fluidizing sections receiving the material, the first being a preheating section, the second being a treating section, and the third being a cooling section, means to direct a treating gas component through the third section to fluidize and cool the material therein and to preheat the gas, means to direct the gas therefrom into the second section to act in the fluidizing and heat treating therein, and means to apply suction above the second section to draw the heated gas through the first section to fluidize the material therein and to preheat the same, and to cool the gas prior to its entry into the suction means.

16. Apparatus for treating fluidizable materials, including three fluidizing sections receiving the material, the first being a preheating section, the second being a treating section, and the third being a cooling section, means to direct a treating gas component through the third section to fluidize and cool the material therein and to preheat the gas, means to direct the gas therefrom into the second section, and means to direct a combustion medium into the second section to provide combustion and act in fluidizing and heat treating therein in said second section, and means to direct the gas from the second section through the first section to fluidize the material therein and to preheat the same, said three sections being disposed one above the other.

17. Apparatus for treating fluidizable materials, including three fluidizing sections receiving the material, the first being a preheating section, the second being a treating section, and the third being a cooling section, means to direct a treating gas component through the third section to fluidize and cool the material therein and to preheat the gas, means to direct the gas therefrom into the second section to act in the fluidizing and heat treating therein, and means to direct the gas from the second section through the first section to fluidize the material therein and to preheat the same, said sections being disposed one after the other to form a continuous bed, and separating chambers between each two sections, said separating chambers being adapted to prevent short-circuiting of the fluidizing gases between the sections, without breaking the overall flow of material through all of the sections.

18. In an apparatus for treating fluidizable materials, a fluidizing bed, partitions over the bed dividing it into three chambers, said partitions providing openings below the level of the fluidized material to permit quasi-liquid flow thereof all across the bed, means introducing a fluidizing gas into the first chamber under first gas conditions, means introducing a fluidizing gas into the third chamber under different gas conditions, and means introducing a fluidizing gas into the second chamber to prevent short-circuiting of the gases between the first and third chambers.

19. A process for fluidizing, comprising supplying fluidizing materials to provide a bed of the same extending between an inlet and an outlet and passing fluidizing gas through said materials to fluidize the same and to cause them to flow from the inlet toward the outlet in simulation of a liquid, separating the bed into individually fluidizable sections, providing flow between them submerged toward the bottom of the fluidized bed of the material therein, without destroying the overall fluidized flow of the material, and individually controlling the fluidization in each section.

20. In a fluidizing process for use with a fluidizing apparatus having a chamber with an inlet and an outlet spaced from each other, the steps of supplying fluidizable material from a supply through the inlet, with a yieldable lateral component of force such that a portion of the material in the supply slides into the chamber, said force being great enough to cause an excessive amount of material to flow in, discharging fluidizing gas into the chamber to fluidize the material therein and develop a hydrostatic force adjacent the inlet to oppose said yieldable lateral component of inflow force and to limit inflow, withdrawing material through the outlet, and so tending to lower the hydrostatic head and causing more material to flow in the inlet to restore the hydrostatic head, and thereby obtaining an equilibrium whereby discharge rate automatically adjusts inflow rate from the supply.

21. In a fluidizing process for use with a fluidizing apparatus of the channel-flow type having an inlet and an outlet spaced from each other on a channel type fluidizing chamber, the inlet being a lateral opening at one end of the chamber, between it and a reserve supply type of supply device adapted to be charged with fluidizable material, the steps of causing portions of said material to slide laterally with a yieldable gravity force through the inlet into the fluidizing chamber, discharging fluidizing gas through the material in the chamber to fluidize the same, producing thereby a hydrostatic head of fluidized material that builds up in opposition to the yieldable gravity force, and equals the same to limit further inflow, withdrawing material from the outlet, thereby causing said hydrostatic head to be reduced, and as a result causing more material to flow in, thus establishing an equilibrium wherein discharge rate establishes rate of inflow from a supply capable of delivering more material than is discharged.

22. In a fluidizing process for use with a fluidizing apparatus of the channel-flow type having an inlet and an outlet spaced from each other on a channel type fluidizing chamber, the inlet being a lateral opening at one end of the chamber, between it and a reserve supply type of supply device adapted to be charged with fluidizable material, the steps of causing portions of said material to slide laterally with a yieldable gravity force through the inlet into the fluidizing chamber, discharging fluidizing gas through the material in the chamber to fluidize the same, producing thereby a hydrostatic head of fluidized material that builds up in opposition to the yieldable gravity force, and equals the same to limit further inflow, withdrawing material from the outlet, thereby causing said hydrostatic head to be reduced, and as a result causing more material to flow in, thus establishing an equilibrium wherein discharge rate establishes rate of inflow from a supply capable of delivering more material than is discharged, and adjusting the size of the inlet to regulate the depth of the fluidized bed of material.

23. A process for fluidizing materials, including the steps of introducing material through an inlet to a channel type of fluidizing chamber, withdrawing material from said chamber at a point spaced along the channel from the inlet, fluidizing the material in the channel between the inlet and the outlet, separating the channel into separate fluidizing sections without breaking the fluidized flow from the inlet toward the outlet, and separately regulating the fluidizing gases in the several sections to effect individual fluidization in said sections without breaking the flow from the inlet toward the outlet.

24. A process for fluidizing materials, including the steps of introducing material through an inlet to a channel type of fluidizing chamber, withdrawing material from said chamber at a point spaced along the channel from the inlet, fluidizing the material in the channel between the inlet and the outlet, separating the channel into separate fluidizing sections without breaking the fluidized flow from the inlet toward the outlet, and separately regulating the fluidizing gases in the several sections to effect individual fluidization in said sections without breaking the flow from the inlet toward the outlet, including the step of discharging different fluidizing gas in at least one section over the others.

25. Apparatus for fluidizing, of the channel-flow type, including a casing, means providing three superposed fluidizing channels in the casing, means providing an inlet into the top channel, first connecting means acting as a discharge for the top channel and an inlet for the middle channel, second connecting means acting as a discharge for the middle channel and an inlet for the bottom channel, means to introduce a reducible material in fluidizable particles to the inlet of the top channel, for fluidized flow through all three channels, including preheating in the top channel, reduction in the middle channel, and cooling in the bottom channel, means to direct air through the bottom channel to fluidize the material therein, cool the same, and preheat the air, means to direct a gaseous combustion mixture including preheated air from the bottom channel, through the middle channel to fluidize the material therein, and reduce the same, means to direct gas from said middle chamber through the top channel to fluidize the material therein and preheat the same, and means for discharge of material from the bottom channel to establish channel flow from the inlet through the three channels and out the outlet.

26. Apparatus for fluidizing, of the channel-flow type, including a casing, means providing three superposed fluidizing channels in the casing, means providing an inlet into the top channel, first connecting means acting as a discharge for the top channel and an inlet for the middle channel, second connecting means acting as a discharge for the middle channel and an inlet for the bottom channel, means to introduce a reducible material in fluidizable particles to the inlet of the top channel, for fluidized flow through all three channels, including preheating in the top channel, reduction in the middle channel, and cooling in the bottom channel, means to direct air through the bottom channel to fluidize the material therein, cool the same, and preheat the air, means to direct a gaseous combustion mixture including preheated air from the bottom channel, through the middle channel to fluidize the material therein, and reduce the same, means to direct gas from said middle chamber through the top channel to fluidize the material therein and preheat the same, and means for discharge of material from the bottom channel to establish channel flow from the inlet through the three channels and out the outlet, and means to conduct gas from above the top channel to the middle channel to regulate the temperature therein.

27. Apparatus for fluidizing, of the channel-flow type, including a casing, means providing three superposed fluidizing channels in the casing, means providing an inlet into the top channel, first connecting means acting as a discharge for the top channel and an inlet for the middle channel, second connecting means acting as a discharge for the middle channel and an inlet for the bottom channel, means to introduce a reducible material in fluidizable particles to the inlet of the top channel, for fluidized flow through all three channels, including preheating in the top channel, reduction in the middle channel, and cooling in the bottom channel, means to direct air through the bottom channel to fluidize the material therein, cool the same, and preheat the air, means to direct a gaseous combustion mixture including preheated air from the bottom channel, through the middle channel to fluidize the material therein, and reduce the same, means to direct gas from said middle chamber through the top channel to fluidize the material therein and preheat the same, and means for discharge of material from the bottom channel to establish channel flow from the inlet through the three channels and out the outlet, partition means across said middle chamber of length to intersect the fluidized material therein but not to break the channel flow, and means to separately regulate the fluidizing gases in the portions of said middle channel formed by said partition means, whereby to accommodate changes in density of the fluidized particles as the reduction progresses.

28. Apparatus for fluidizing, of the channel-flow type, including a casing, means providing three superposed fluidizing channels in the casing, means providing an inlet into the top channel, first connecting means acting as a discharge for the top channel and an inlet for the middle channel, second connecting means acting as a discharge for the middle channel and an inlet for the bottom channel, means to introduce a reducible material in fluidizable particles to the inlet of the top channel, for fluidized flow through all three channels, including preheating in the top channel, reduction in the middle channel, and cooling in the bottom channel, means to direct air through the bottom channel to fluidize the material therein, cool the same, and preheat the air, means to direct a gaseous combustion mixture including preheated air from the bottom channel, through the middle channel to fluidize the material therein, and reduce the same, means to direct gas from said middle chamber through the top channel to fluidize the material therein and preheat the same, and means for discharge of material from the bottom channel to establish channel flow from the inlet through the three channels and out the outlet, said first connecting means comprising a passage smaller than the second connecting means, whereby the velocity through the first connecting means is relatively high, and that through the second connecting means is relatively low.

29. A method of reducing ores, including the steps of introducing fluidizable particles of reducible ore to one end of a channel type of fluidizing bed, and withdrawing reduced particles from the other end of the channel, supplying combustible fluidizing gases along the channel to fluidize the ore, providing combustion of said gases to reduce the ore during the fluidization, and separately regulating the fluidizing gas conditions along the channel to accommodate changes in density of the particles as they are reduced.

30. A method of reducing ores, including the steps of introducing fluidizable particles of reducible ore to one end of a channel type of fluidizing bed, and withdrawing reduced particles from the other end of the channel, supplying combustible fluidizing gases along the channel to fluidize the ore, producing partial combustion of said gases prior to their introduction to the fluidizable material, and directing said partially burned gases into the material in the channel to fluidize the material and to reduce the same.

31. A method of reducing ores, including the steps of introducing fluidizable particles of reducible ore to one end of a channel type of fluidizing bed, and withdrawing reduced particles from the other end of the channel, supplying combustible fluidizing gases along the channel to fluidize the ore, producing partial combustion of said gases prior to their introduction to the fluidizable material, directing said partially burned gases into the material in the channel to fluidize the material and to reduce the same, passing the material prior to introduction into said inlet of said channel, through a preheating fluidizer, and directing combustion gases from said channel through said preheating fluidizer to fluidize the material therein and preheat it.

WOLF G. BAUER.

REFERENCES CITED

The following references are of record in the file of this patent:

UNITED STATES PATENTS

| Number | Name | Date |
|---|---|---|
| 1,066,718 | Doherty | July 8, 1913 |
| 1,066,719 | Doherty | July 8, 1913 |
| 1,802,959 | Simonds | Apr. 28, 1931 |
| 1,802,960 | Simonds | Apr. 28, 1931 |
| 1,984,380 | Odell | Dec. 18, 1934 |
| 2,270,903 | Rudbach | Jan. 27, 1942 |
| 2,316,664 | Brassert et al. | Apr. 13, 1943 |
| 2,361,978 | Swearingen | Nov. 7, 1944 |
| 2,366,372 | Voorhees | Jan. 2, 1945 |
| 2,371,619 | Hartley | Mar. 20, 1945 |
| 2,377,935 | Gunness | June 12, 1945 |
| 2,378,542 | Edmister | June 19, 1945 |
| 2,378,607 | Watts | June 19, 1945 |
| 2,379,711 | Hemminger | July 3, 1945 |
| 2,409,707 | Roetheli | Oct. 22, 1946 |
| 2,444,990 | Hemminger | July 13, 1948 |
| 2,498,710 | Roetheli | Feb. 28, 1950 |